No. 606,666. Patented July 5, 1898.
H. HÜBNER.
CLOTHES LINE REEL.
(Application filed Dec. 21, 1897.)
(No Model.)
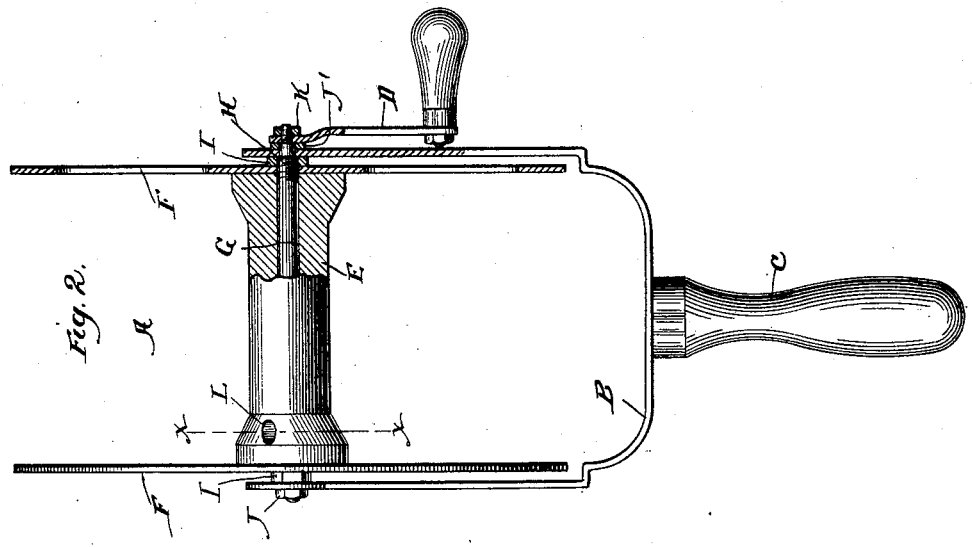
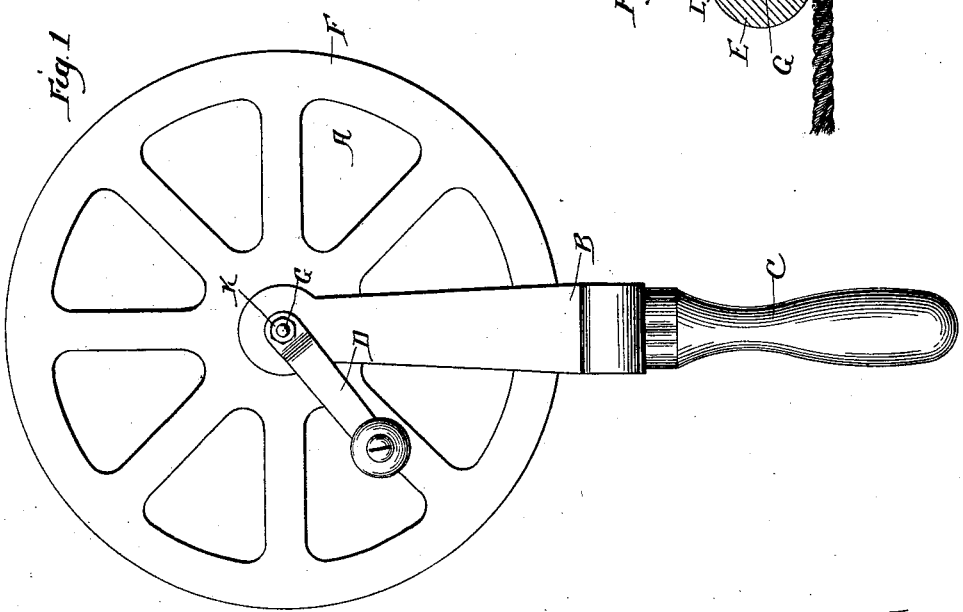
Witnesses:
H. B. Hallock
R. M. Pierce
Inventor
Harry Hübner
By J. J. Williamson
Attorney

UNITED STATES PATENT OFFICE.

HARRY HÜBNER, OF PHILADELPHIA, PENNSYLVANIA.

CLOTHES-LINE REEL.

SPECIFICATION forming part of Letters Patent No. 606,666, dated July 5, 1898.

Application filed December 21, 1897. Serial No. 662,849. (No model.)

*To all whom it may concern:*

Be it known that I, HARRY HÜBNER, a citizen of the United States, residing at Philadelphia, in the county of Philadelphia and State of Pennsylvania, have invented a certain new and useful Improvement in Clothes-Line Reels, of which the following is a specification.

My invention relates to a new and useful improvement in clothes-line reels, and has for its object, first, to construct a reel that will be cheap, simple, and at the same time strong and easily manipulated, and, second, to provide means for easily and quickly attaching and detaching the inner end of the clothes-line to and from the spindle of reel.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a side elevation of my reel. Fig. 2 is a front view, part being in elevation and part in section; and Fig. 3 is a section on the line x x of Fig. 2, showing the manner of attaching the clothes-line to spindle of reel.

In carrying out my invention as here embodied I mount a spool A in bearings formed in the ends of the upwardly-extending arms of the U-shaped support B, a handle C being secured to the lower part of said support for conveniently holding the reel while being operated. A crank D is provided on one side of the reel for revolving the spool A. The spool A consists of a spindle E, side pieces or disks F, and rod G. The said rod is driven tightly through the spindle E, leaving protruding ends at each side, which ends are screw-threaded, as indicated at H. The side pieces F are slipped upon the protruding ends of the rod G and followed up by the nuts I, thereby binding the spindle E tightly between the sides F, thus forming the spool of the reel. This spool is mounted in the support B by the two arms of said support being sprung upon the ends of the rod G and secured thereon at one side by the nut J, said nut binding against a shoulder on the rod G, similar to the shoulder at the opposite end, (shown in Fig. 2 of the drawings and described below,) thereby leaving the spool free to revolve in its bearing in that arm of the support. A washer J' is then slipped on the other end of the rod G, and the rod G is shouldered just beyond the outer face of said washer and is screw-threaded from there out. Upon this screw-threaded portion is then screwed the crank D and followed by the nut K, thereby binding the crank D to the rod G, but at the same time leaving the spool A free to revolve. Both ends of the rod are formed identically the same, and the only difference in securing them in place is the omission of a crank on one end.

A hole L is drilled in the spindle E tangential to its center for the purpose of receiving one end of the clothes-line, which end is first inserted in said hole, and then when the spool is revolved it gives the line a sudden bend across the sharp edge M, thereby securely holding the end of the line fast to the spindle E, but in no way interfering with it, being easily detached when the clothes-line is unwound.

In the side pieces or disks F, I have shown portions punched out for the purpose of lightening the reel and also for allowing the free access of air to the clothes-line when wound upon the spool, which is very beneficial and necessary when the line is wound up damp.

The operation of my invention is as follows: When the clothes-line is to be taken down, the handle C of the reel is grasped in one hand, and after the end of the line is inserted in the hole L the spool is revolved by means of crank D until the whole line is wound thereon. In putting up the line the outer end thereof is fastened to the clothes-line support and the reel carried to the next place of fastening, the line unwinding as you go, and so on to the end, which end easily detaches itself.

I am aware that there could be slight modifications made in the construction of the reel. Therefore I do not wish to be limited to the exact construction here shown.

Having thus fully described my invention, what I claim as new and useful is—

In combination, a spindle E, a rod G driven therethrough, side pieces F through which the rod G passes, having openings therein for allowing free access of air to the clothes-line for drying the same, nuts I threaded upon the rod G outside of said side pieces for clamping the spindle E between the side pieces F, a U-shaped support B, the upper ends of the two arms of which form bearings for the rod G, a nut J threaded upon the rod G outside of one arm of the support B, a crank D and nut K threaded upon the opposite end of the rod G outside of the other arm of the support B, a handle C secured to the support B, and means for attaching a clothes-line to the spindle E, as specified.

In testimony whereof I have hereunto affixed my signature in the presence of two subscribing witnesses.

HARRY HÜBNER.

Witnesses:
A. HAGEL,
ANDREW SCHIMMEL, Jr.